United States Patent

Semerau, Jr.

[11] Patent Number: 4,730,739
[45] Date of Patent: Mar. 15, 1988

[54] OPEN FRAMEWORK MERCHANDISE DISPLAY SYSTEM

[76] Inventor: Robert J. Semerau, Jr., 28541 Casanal, Mission Viejo, Calif. 92692

[21] Appl. No.: 10,759

[22] Filed: Feb. 4, 1987

[51] Int. Cl.$^4$ ............................................. A47F 5/00
[52] U.S. Cl. ................................................... 211/189
[58] Field of Search ............... 211/189, 182, 191, 190, 211/113, 118, 187, 186

[56] References Cited

U.S. PATENT DOCUMENTS

| | | | |
|---|---|---|---|
| 2,897,013 | 7/1959 | Delp | 211/189 X |
| 3,834,549 | 9/1974 | Burg et al. | 211/189 |
| 4,624,374 | 11/1986 | Murtaugh | 211/182 X |
| 4,667,451 | 5/1987 | Onoda | 52/646 |

FOREIGN PATENT DOCUMENTS

| | | | |
|---|---|---|---|
| 2816919 | 11/1978 | Fed. Rep. of Germany | 211/189 |
| 497490 | 9/1954 | Italy | 211/189 |

Primary Examiner—Robert W. Gibson, Jr.
Attorney, Agent, or Firm—Allan R. Fowler

[57] ABSTRACT

An open framework merchandise display system consists of triangular trusses joined by junction plates and junction flanges. Three rods protrude from one side of each junction plate and into the hollow longitudinal tubes of the truss. A post with a square cross section protrudes from the other side of the junction plate and fits between horizontal parallel plates of the junction flange.

The flange plates have an octagonal system of pins and bolt holes, which fit against matching slots and holes in the posts, allowing the horizontal trusses to join the flange at 45 degree increments. A similar set of vertical plates is welded to the top and bottom of the flange, allowing vertical trusses to join the flange as well.

The tubes of each truss are joined by "Z" shaped cross members, allowing display from the truss itself. The cross section of each truss is an isosceles triangle formed by inscribing same within a square, allowing shelves to be attached at 90 degree increments.

Trusses may be joined end to end by a centerplate, with three rods protruding from each side. They are modularized by making their lengths integral multiples of the size of a junction flange with two opposing junction plates.

Base plates and wall and ceiling spacers are provided.

Junction plates, centerplates, and base plates each include a hole for access into the interior of the truss.

Clamps attach each display means to a pair of trusses.

11 Claims, 13 Drawing Figures

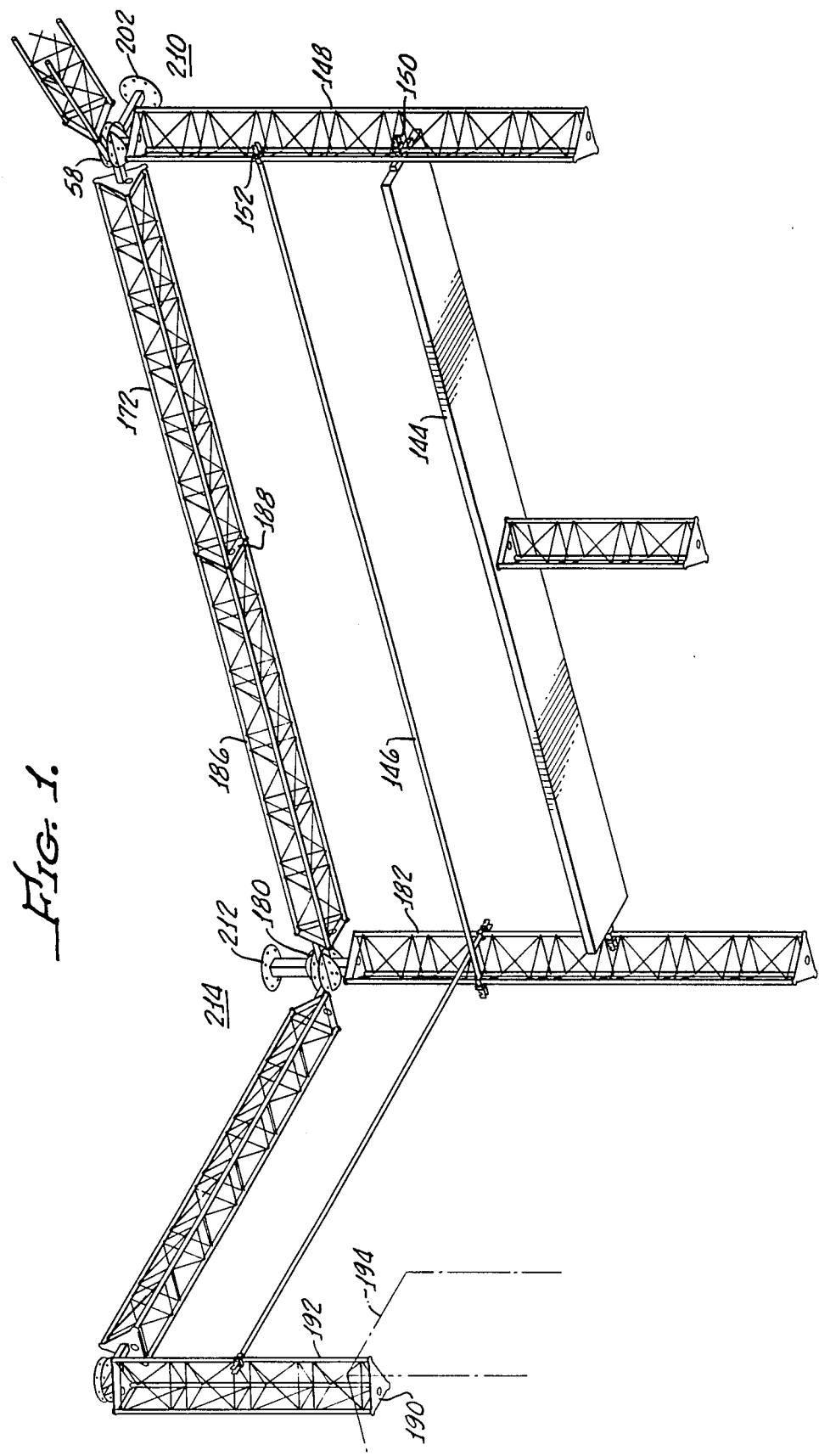

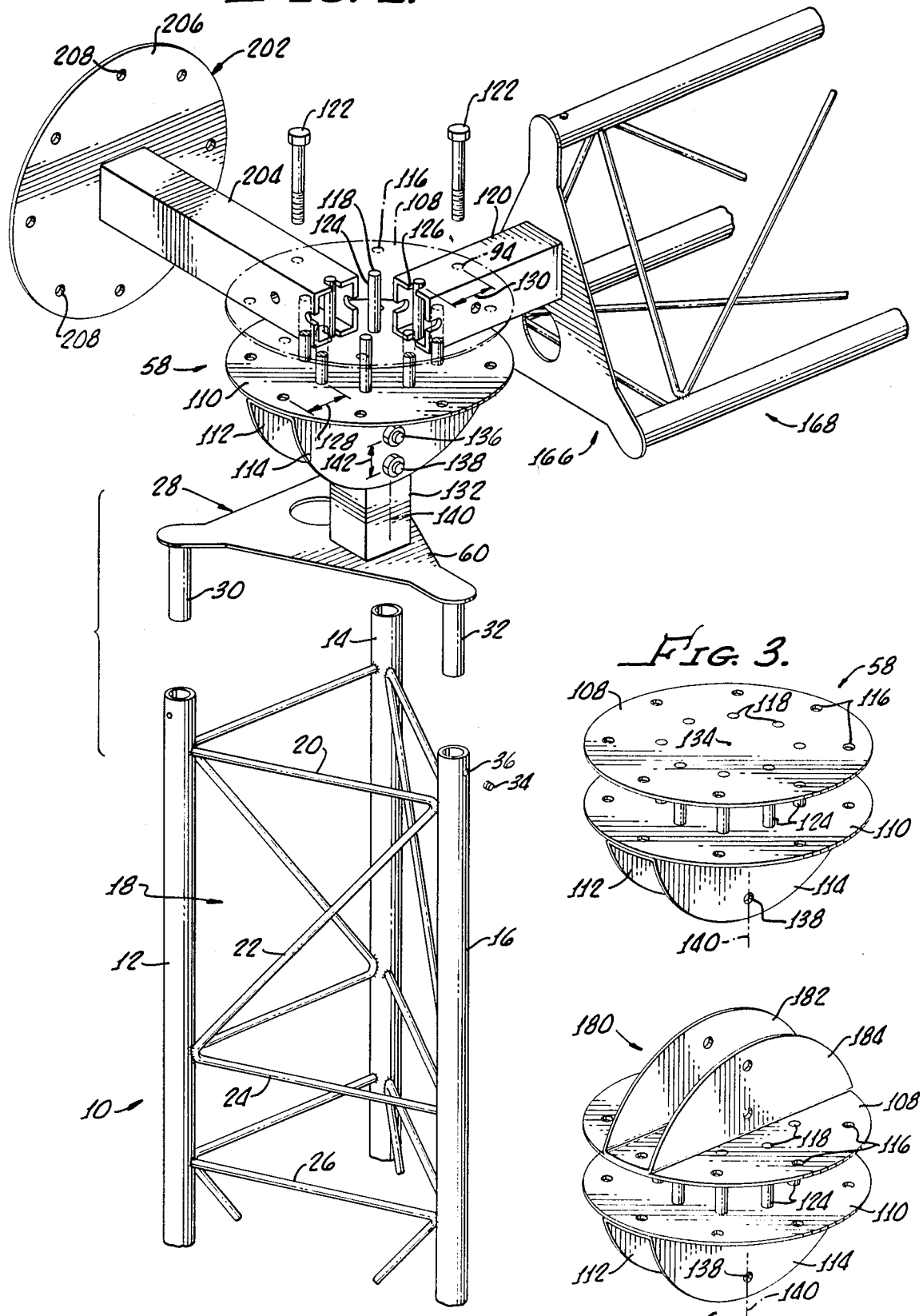

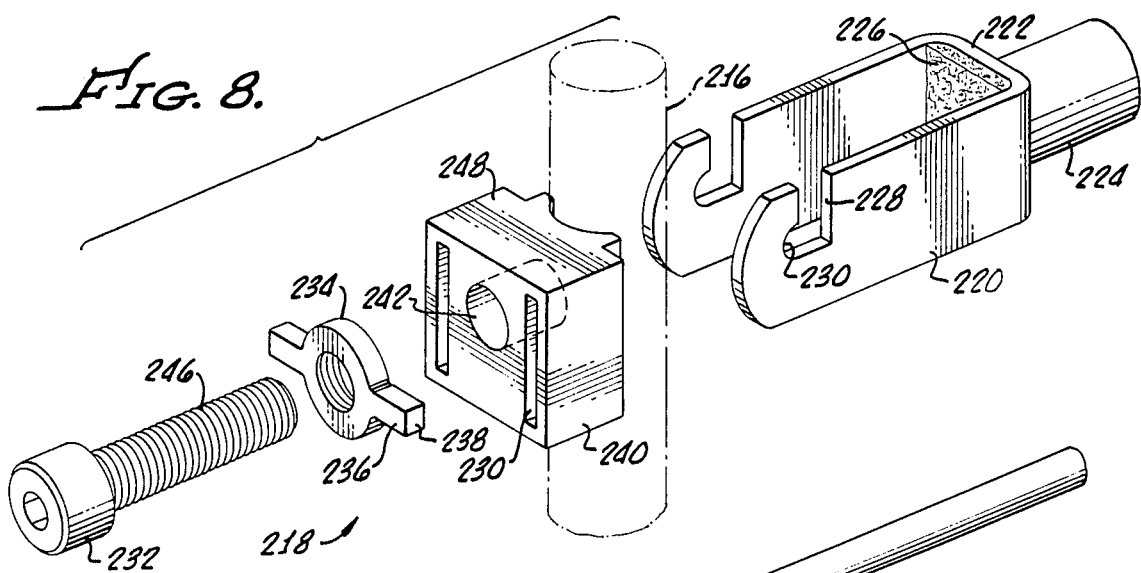
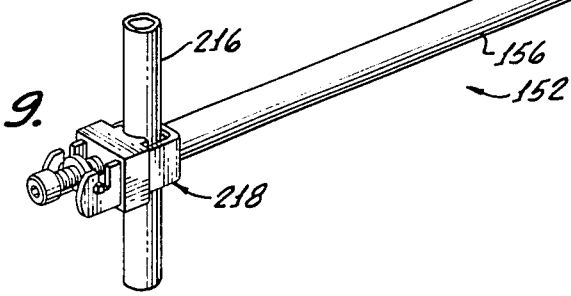
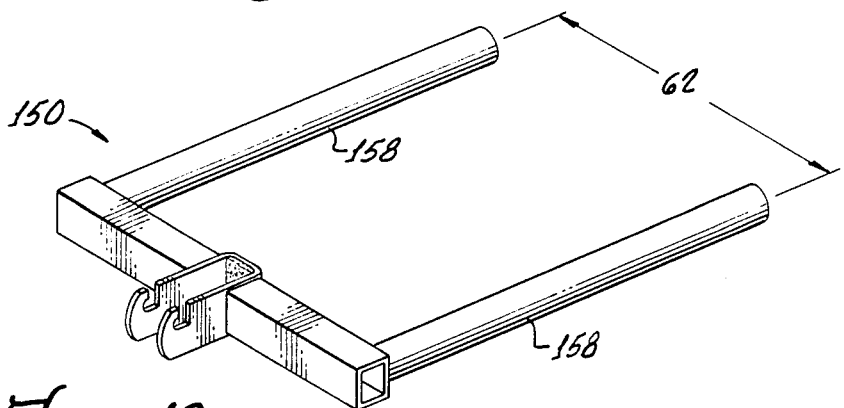
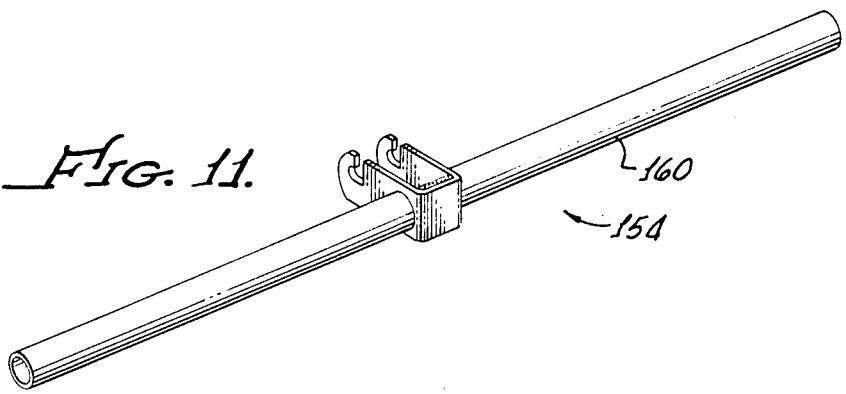

OPEN FRAMEWORK MERCHANDISE DISPLAY SYSTEM

This invention relates to systems for displaying merchandise, and more specifically has reference to merchandise display systems which use an open framework.

A merchant needs a system for displaying his wares which sets them in their best light, yet draws no attention away from them and to itself.

A system which relies primarily on walls or counters to display the merchandise runs the risk that the wall or counter will distract the customer's attention. Moreover, walls and counters which are strong enough to support a wide selection of merchandise are usually opaque, thereby cutting off the customer's view of merchandise beyound that which is within reach.

The alternative is free standing racks. These are often unsatisfactory because they lack the strength and stability of walls and counters. Strength and stability are vital in the presence of consumers, many of whom are children or otherwise not fully aware of the consequences of careless handling of an apparently solid display.

Free standing racks can be made to be strong and stable, but only at the expense of permanently affixing them to the showroom floor. This weight and inflexibility make it impossible to rearrange the racks to adapt to the changing tastes of the public. Finally, when the lease expires, a permanent rack must either be abandoned to the landlord, or removed with such damage to the floor as to cause substantial repair costs.

Trusses have the virtues of lightness, strength, and practical transparency. They have been used to support lights, and have been considered for use in displaying merchandise. The experience with lights, however, has led to the general belief that trusses would be unsuitable for displaying merchandise.

The problem arises in making right angle turns, either vertical to horizontal or front-back to right-left. The portion of the truss which makes the turn is weaker than the remainder of the truss, and rarely turns at an exact right angle. This looks bad to the customers.

The turn can be adjusted to an exact light angle by allowing a little play in the joints, but allowing play in the joints makes it weaker.

Trusses have therefore been limited to lights, which are fairly lightweight, and, even then, have further been limited to fixed locations. A truss can be custom built to a particular location without excessive play in the joints, but then it is just as inflexible as the walls or counters which are sought to be replaced.

The present invention satisfies all these needs at once with a system of modular trusses which bolt together by means of junction flanges. The junction flanges connect with the trusses by means of junction plates. The junction flanges and junction plates, being manufactured separately from the trusses, can be made strong enough to overcome the weak link in the system. An open framework of vertical trusses may thus be formed, connected at the top (or middle, for that matter) by horizontal trusses. The horizontal trusses meet one another at either right angles or straight angles.

In accordance with one embodiment of the invention, the cross section of a truss is a triangle, as is old in the art, but it is not the ordinary equilateral triangle. Instead, it is the isosceles triangle formed by inscribing a triangle in a square. That is, two vertices of the triangle are adjacent corners on the top of the square, and the third vertex is the midpoint of the opposite (bottom) side of the square.

In this embodiment, the edges of the circumscribed square and the directions of the four perpendicular horizontal trusses may be aligned. When this is done, the area bounded by any two adjoining vertical trusses has a very desirable property. Each vertical truss has pair of vertical members which are separated, in a direction perpendicular to the plane of the area, by a distance independent of which of the four horizontal trusses bounds the top of the area. This distance is the length of a side of the circumscribing square. Merchandise display elements can then be attached very conveniently directly to the vertical trusses involved. The convenience arises from the ability to use standardized attachment devices, sized to fit this standardized separation.

The above and other important features of the present invention will be better understood from the following detailed description of a preferred embodiment of the invention, made with reference to to accompanying drawings, in which:

FIG. 1 is a side perspective view of the system, seen slightly from below, illustrating how the trusses are connected at junction flanges, are spaced from the walls and ceiling, may support display shelves and rods, are supported by base plates, and may be combined into longer trusses by means of a centerplate;

FIG. 2 is a detail perspective view, seen slightly from above, illustrating a junction flange, with its top plate being shown in phantom lines, joining a horizontal junction plate and truss on one side with a wall spacer on another, and further illustrating a vertical junction plate, attached to the bottom of the junction flange, ready to be joined to the three tubes of a vertical truss;

FIG. 3 is the same perspective view, but of a junction flange only;

FIG. 4 is a perspective view of an improved junction flange, which may support a vertical truss as well as be supported by one;

FIG. 8 is an exploded view of a clamp for attaching a display (not shown) to a tube (shown in phantom line) of a vertical truss;

FIG. 9 is a side perspective view of a clamp supporting a horizontal bar;

FIG. 10 is a side perspective view of a pair of spaced parallel bars adapted to be joined to a tube by a clamp;

FIG. 11 is a side perspective view of a transverse bar adapted to be joined to a tube by a clamp;

Figure 12:
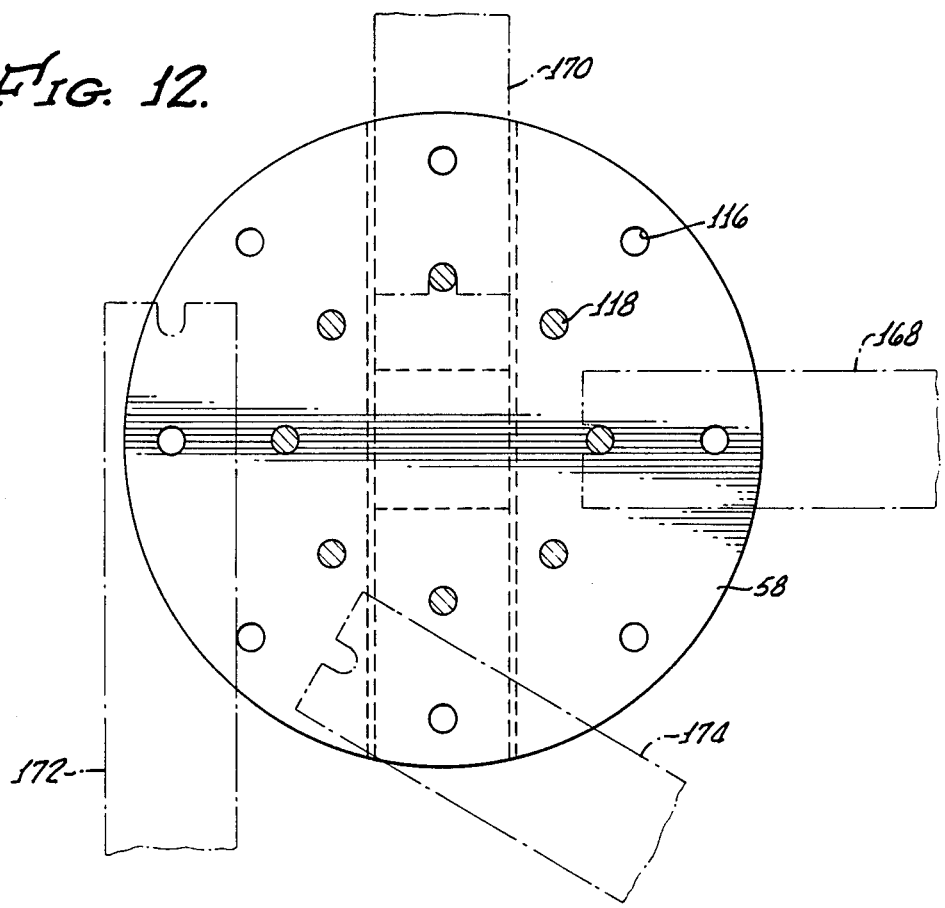
Figure 13:
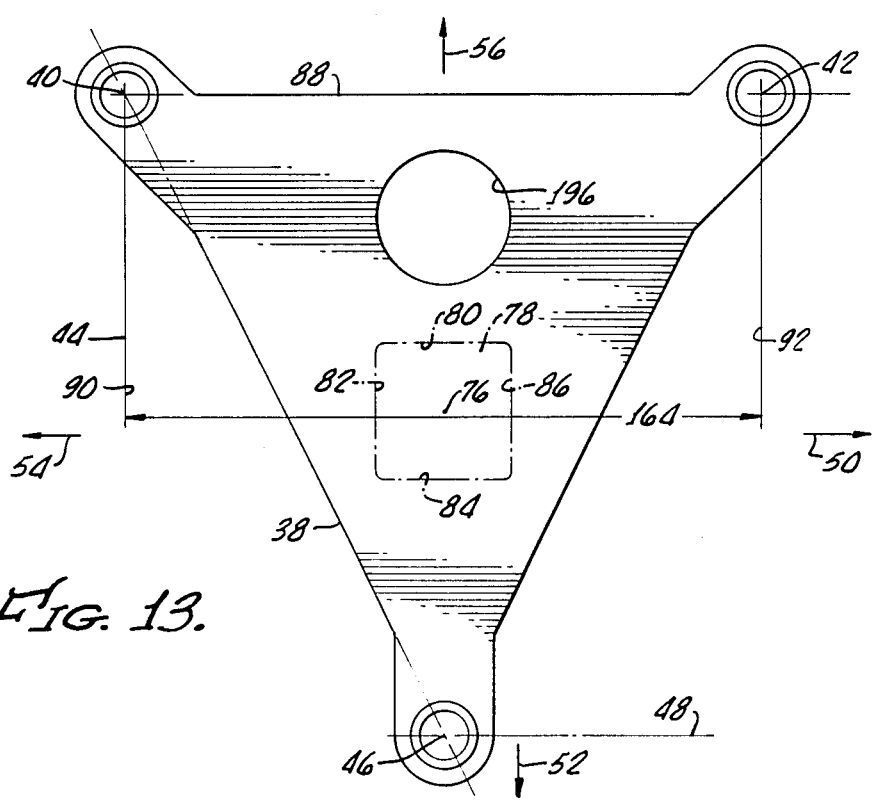

FIG. 12 is a top elevation view of a junction flange illustrating several of the ways in which the post of a junction plate may be joined to the junction flange; and FIG. 13 is a bottom elevation view of a junction plate illustrating how the rods on the bottom face of the plate form a triangle inscribed within a square, and how the post (shown in phantom line) on the top face of the plate is centered on the center of the square and has a square cross section parallel to it.

The basic unit of the system is the truss.

As is best shown in FIG. 2, each truss 10 has three parallel truss tubes 12, 14, 16, joined by "Z" shaped cross members 18. Each cross member 18 has a horizontal top member 20, a diagonal center member 22, and a horizontal bottom member 24. The cross members are spaced so that the horizontal bottom member 24 of one is a precise distance from the horizontal top member 26 of the next, for reasons which will become apparent.

Each truss 10 may be joined to a junction plate 28, which has three protruding rods, two of which, 30, 32, appear in FIG. 2. Exemplary rod 32 penetrates the end of tube 16 and is held in place by a set screw 34 which penetrates the side of tube 16 through a set screw hole 36. The rods penetrating tubes 12 and 14 are likewise held in place by set screws (not shown).

Figure 5:
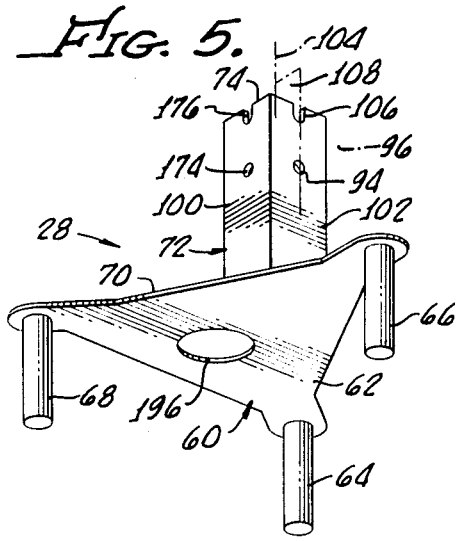
FIG. 5 is a perspective view of a junction plate apart from the junction flange and the truss which it usually joins.

FIG. 5 shows a perspective view of a junction plate. As is best shown in the end elevation view of FIG. 13, a cross section of each junction plate, and thus of each truss, is the same as that of any other junction plate (truss). It has the shape of the isoceles triangle 38 formed by joining two adjacent corners 40, 42, of a square 44 with the midpoint 46 of the side 48 of the square 44 opposite those corners 40, 42. In this shape, the truss can support parallel attachments (not shown) from any of four directions 50, 52, 54, and 56. At the same time, its cross section is a triangle 38, which is more stable than a square 44.

As is best shown in FIG. 2, a truss 10 is joined to a junction flange 58 by a junction plate 28. As best shown in FIG. 5, each junction plate 28 is a plate 60 with two faces. The bottom face 62 has three rods 64, 66, 68 protruding perpendicularly from it, which penetrate the tubes of a truss (not shown). On the top face 70 of the plate 60 there is a perpendicular post 72 with a square cross section and a flat end 74. The post 72 may be either solid or hollow, but hollow posts give adequate strength and greatly reduced weight.

As best seen in FIG. 13, the axis 76 of the post 78 intersects the center of the square 44 from which the cross section of the truss (not shown) was formed, and the post has sides 80, 82, 84, 86 which are parallel to the sides 88, 90, 48, 92 of the square 44.

Returning to FIG. 5, the post 72 has a hole 94 through it, the axis 96 of which is parallel both to the plate 60 and to a pair of the sides 100, 102 of the post 72. The axis 96 of the hole 94 intersects the axis 104 of the post 72.

The post 72 also has a slot 106 through it, whose center plane 108 is determined by the axis 96 of the hole 94 and the axis 104 of the post 72. The slot 106 extends toward, but not to, the hole 94, approaching it from the end 74 of the post 72 opposite the plate 60.

Returning to FIGS. 2 and 3, it is seen that the purpose of a junction plate 28 is to join a truss 10 with a junction flange 58.

A junction flange 58 is a pair of parallel horizontal plates 108, 110, with a pair of parallel vertical plates 112, 114 attached to the bottom of the bottom horizontal plate 110. The horizontal plates 108, 110, are circular; the vertical plates 112, 114, are bounded by an arc and a chord of a circle of the same radius. The vertical plates 112, 114, may conveniently be formed from the same disk, bent into a rectangular "U" along a diameter and welded to the bottom of the bottom horizontal plate 110.

The horizontal plates 108, 110, each have sixteen holes 116, 118, in them, the holes 116, 118 of each being opposite the holes 116, 118, of the other. The holes 116, 118, each have a diameter approximately equal to that of a junction plate post hole 94. This is done to allow a junction plate post 120 to be inserted between the horizontal plates 108, 110, and for a bolt or similar fastener 122 to be inserted through the holes 94, 116, of both the post 120 and the plates 108, 112.

The holes 116, 118, arranged in two concentric regular octagons with parallel sides.

The inner octagon of holes 118 is filled with rods 124 perpendicular to the horizontal plates 108, 112. They separate the two horizontal plates 108, 112, just far enough for a junction plate post 120 to fit between them. Each rod 124 also provides a stop for the post 120, and is sized to fit the slot 126 in the post 120.

The radius of the outer octagon of holes 116 is larger than the radius of the inner octagon of holes 118 by a distance 128 approximately equal to the distance 130 between the slot 126 and the hole 94 of a junction plate post 120. In this way, the hole 94 in the post 120 automatically lines up with the outer octagon of holes 116 in the horizontal plates 108, 110.

The vertical plates 112, 114, are joined to the bottom of the bottom horizontal plate 110. They are separated from each other just far enough for a junction plate post 132 to fit between them. The center 134 of the octagons of holes 116, 118, is half way between the vertical plates 112, 114.

Each vertical plate 112, 114, has a pair of holes 136, 138, opposite those of the other. The holes 136, 138, have diameters equal to those of a junction plate post hole 94, are on a vertical line 140 which intersects the point (not shown) on the vertical plates 114, 114, which is closet to the center 134 of the octagons of holes 116, 118, and are separated by a distance 142 approximately equal to the distance 130 between the slot 126 and the hole 94 of a junction plate post 120.

The junction plate posts 120 are fastened to the junction flange 58 by some fastening means 122, preferably bolts, sized to fit the junction plate post holes 94.

Turning now to FIG. 1, shelves 144, racks 146, or any other means may be used to display merchandise (not shown). These display means 144, 146, are attached to a truss 148 by some attaching means 150, 152. Turning to FIGS. 9, 10, and 11, it is seen that each attaching means 150, 152, 154 includes one or two attaching members 156, 158, 160, such as rods.

Attaching means 150 which include a spaced pair of parallel attaching members 158, the spacing 162 being fixed, are particularly suited to this invention. The spacing 162 must, however, be equal to the distance 164 (see FIG. 13) between the corners 40, 42, of the junction plate 28 which are closest to each other. This distance 164 is the length of the truss side of the square 44 from which the cross section of the truss 10 was formed. In this case, each attaching member 158 can join to a separate truss tube 12, 14, or 16, yet spacing and parallelism will be maintained.

It is thus seen that each vertical truss 10 supports a junction plate 28 oriented vertically. This junction plate 28 in turn supports the bottom of a junction flange 58 by its vertical plates 112, 114. The sides of the junction flange 58, i.e. its horizontal plates 108, 110, in turn support one or more junction plates 166 oriented horizontally. Each of these junction plates 166 in turn supports a horizontal truss 168.

Turning to FIG. 12, the top elevation view of a junction flange, it is further seen that a horizontal truss 168, 170, may be joined to a junction flange 58 at any increment of 45 degrees. At these increments, the truss will be attached at both the inner, 118, and outer, 116, octagons of holes, and azimuthal stability will be assured.

If azimuthal stability is not required, a truss may be fixed to only the outer octagon of holes 116, either resting against a bolt in another of the outer holes, 172, or entirely independent of any other hole, 174. In this configuration, the truss is not limited to increments of 45 degrees.

Between increments of 90 degrees, an attaching means 150, 152 (FIG. 1) may be used to attach the display means 144, 146 (FIG. 1) to the vertical truss 148. The attaching means 150, 152, and the display means 144, 146, will be parallel to and generally below the horizontal truss 172.

It is finally seen that a display means such as a shelf 144, which is adapted to being attached to the vertical truss 148 by an attaching means 150 (FIG. 10) which has a pair of attaching members, 158, may also be attached to the vertical truss 148 by a pair of attaching means 152 (FIG. 9), each of which has only a single attaching member 156. It will be required, however, that this be at an increment of 90 degrees, and that the spacing 162 (FIG. 13) between the attaching members equal the spacing 164 between the closest pair of junction plate rods 42, 42.

The attaching means 152 (FIG. 1) remains parallel to and generally below the horizontal truss 172, the same as attaching means 150. The vertical truss 148 provides a pair of truss tubes 12, 14, or 16 (FIG. 2), each of which supports a separate attaching member 152. At 90 degree increments, the truss tubes 12, 14, or 16 have a spacing 164 (FIG. 13) which matches the spacing 162 (FIG. 10) of the attaching members 158. The display means thus resists the torque imposed by the merchandise (not shown) not being precisely positioned below the horizontal truss 10.

In an improved version, the open framework merchandise display system uses junction plate posts 72 (FIG. 5) which have a second hole 174 and slot 176 combination through it, having the same structure as the first hole 94 and slot 106 combination, but perpendicular to it. In this version, a junction plate 60, or 166 (FIG. 1), may be detached from a junction flange 58, rotated axially through any increment of 90 degrees, and reattached to the junction flange 58.

In another version, FIG. 4, the junction flange 180 is made symmetric about the midplane of the horizontal plates 108, 110, by continuing the vertical plates 112, 114, above, and joining them to the top of the top horizontal plate 108. The gap between the horizontal plates 108, 110, for inserting junction plate posts 120 (FIG. 1), is retained. The upper vertical plates 182, 184, are symmetric to the lower vertical plates 112, 114. They likewise may conveniently be made of a single disk bent into the shape of a rectangular "U" and welded to the top of the top horizontal plate 108. In this version, the junction flange 180 (FIG. 1) may not only be supported by, but may also support, a vertical truss 182.

Returning to FIG. 2, each cross member 18 of the truss 10 is in the shape and orientation of a "Z" when the tubes 12, 14, 16, of a truss 10 are oriented vertically. Each cross member 18 has a horizontal top member 20, a diagonal center member 22, and a horizontal bottom member 24. Each of these three members 20, 22, 24, of cross member 18 joins two tubes 12, 14, or 16 of the truss 10.

Consecutive cross members 18 joining the same two tubes 12, 14, or 16, of the truss 10 are so spaced from one another that, when a standard gridwall mount bracket (not shown) is hung on the horizontal bottom member 24 of the higher cross member 18, the bottom of the gridwall mount bracket is supported by the horizontal top member 26 of the lower cross member (not shown). A gridwall mount bracket therefore may have, but does not require, an intermediate grid or other display means to be attached to the vertical trusses 10. It may be attached to a vertical truss 10 directly.

Figure 6:
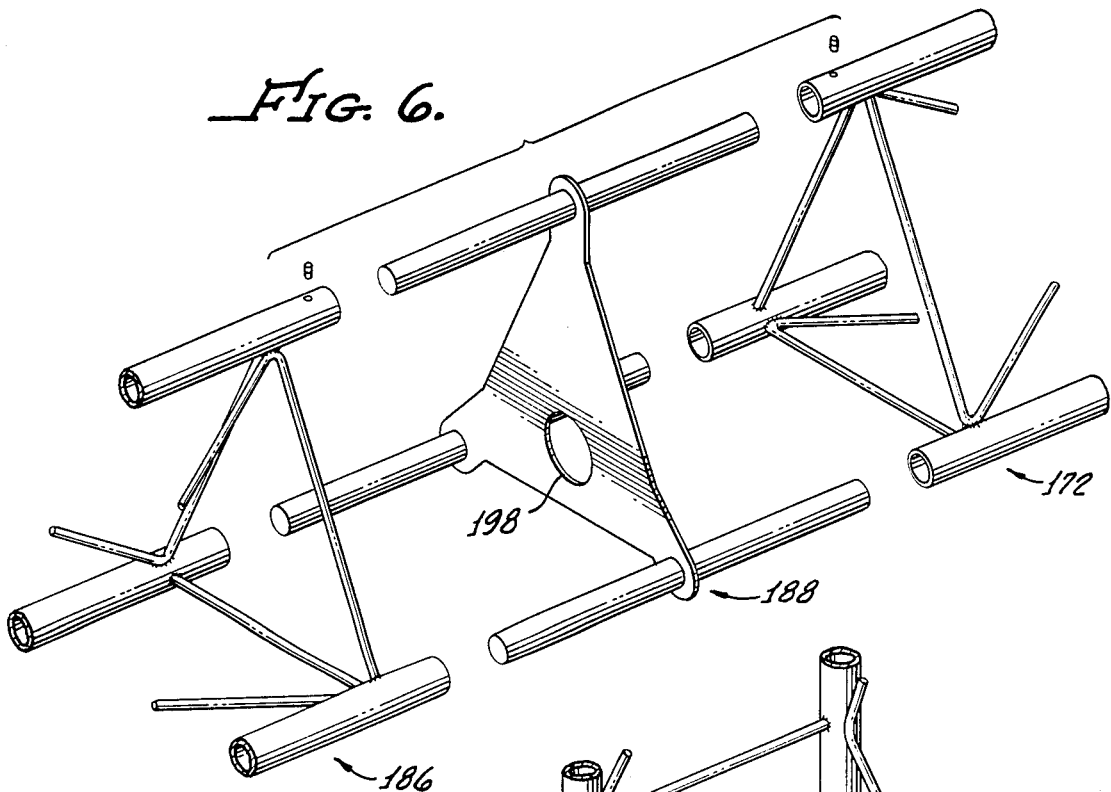
FIG. 6 is an exploded view of a truss centerplate joining the ends of two shorter trusses into a longer truss.

Shorter length trusses 172, 186 (FIGS. 1 and 6), may be combined by means of one or more truss centerplates 188. A truss centerplate 188 is a junction plate 28 (FIG. 5) with the post 72 omitted and the rods 64, 66, 68, protruding from both faces 62, 70 of the plate 60. A pair of short trusses 172, 178 may be fastened to each face of the truss centerplate 186, thereby effectively producing a longer truss.

Each truss 172, 186, has a length which is some unit length (not shown), or an integral multiple of that unit length. This allows a combination truss formed by joining two shorter trusses 172, 186, with a centerplate 188, to have the same length as a longer, non-combination truss (not shown). This makes it easier to line up parallel horizontal trusses.

The junction flange 58 (FIG. 1) is so sized that, when junction plates 166 are joined to opposite sides of the junction flange 58, whether horizontally or vertically (FIG. 4), their outer faces (not shown) are separated by a distance equal to the unit length. This allows a junction flange 58 and a minimum length truss (not shown) to be substituted for each other.

Figure 7:
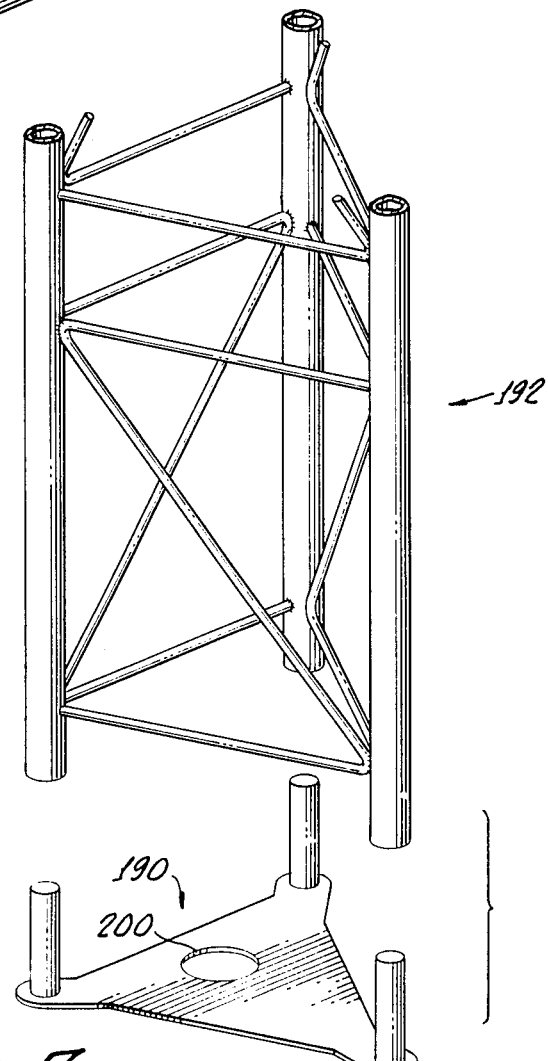
FIG. 7 is an exploded view of a base plate on a supporting surface (not shown) supporting a vertical truss.

Base plates 190 (FIG. 7) are provided for those vertical trusses 192, which rest upon a supporting surface 194 (FIG. 1. phantom lines). A base plate 190 is a junction plate 28 (FIG. 5) with the post 72 omitted.

Each junction plate 28 (FIG. 5), truss centerplate 186 (FIG. 6), and base plate 190 (FIG. 7), has a hole 196, 198, 200, through it near the short side of the junction plate 28, truss centerplate 186, or base plate 190. This provides access into the interior of the truss 172, 186, 192, for electrical conduit (not shown) or other desirable items.

Wall spacers 202 (FIGS. 1 and 2) are provided, each of which is the post 204 of a junction plate 166, joined, at the end opposite the slotted end 74 (FIG. 5), to a plate 206, perpendicular to the axis 104 (FIG. 5) of the post 72. The plate 206 has holes 208 in it, allowing screws, bolts, or other fasteners (not shown) to be inserted through the holes 208 and into a wall 210 (FIG. 1). The plate 206 of a wall spacer 202 may be the same as one of the horizontal plates 108, 110, of a junction flange, including only the outer octagon of holes 116.

When the side of a junction flange 58 (FIG. 2) is attached to the post 204, the wall spacer 202 keeps the junction flange 58 at the desired distance from the wall 210 (FIG. 1). A vertically oriented wall spacer 212 may also be inserted into the top of a junction flange 180, rather than into its side, and fastened to a ceiling 214.

The attaching means 150, 152, 154 (FIGS. 9, 10, and 11) include an attaching member or members 152, 154, 158, which joins the attaching means to the display means 144, 146 (FIG. 1), and which join to the truss tube 216 (FIG. 8, 9) by a compression grip 218 (FIG. 8).

The compression grip 218 is made of an approximately rectangular plate 220, the center 222 of which is permanently attached to the attaching means 224. The plate 220 is bent along its long axis into a rectangular "U". The inside of the center 222 has a cushion 226 of some suitable material, preferably cork. The plate 220 has a pair of symmetrical notches 228, one near each end of on of the long sides of the plate 220. Each notch 228 has a retaining notch 230 on the side of the notch 228 furthest from the center 222. The ends of the plate 220 are rounded.

A bolt 232 runs parallel to and between the sides of the "U". A threaded nut 234 fits onto the bolt 232. It has a pair of wings 236 protruding from its sides, each wing 236 being opposite the other. The distance from the distal end 238 of one wing 236 to the distal end 238 of the other is greater than distance between the notches 228 across the "U". The diameter of each wing 236 is slightly less than the width of the notches 228 and retaining notches 230.

An unthreaded hollow bolt fitting 240 has a cylindrical interior cavity 242 which is slightly larger than the diameter of the bolt 232, and fits over the threads 246 of the bolt 232. The exterior surface 248 of the bolt fitting 224 opposite the cavity 242 has a shape inverse to the shape of the truss tube 216.

There are two enclosed slots 250 through the bolt fitting 240, on opposite sides of the cylindrical cavity 242, parallel to the axis of the cylindrical cavity 242 and to each other, sized to receive the plate 220;

The plate 220 fits around the truss tube 216 and through the slots 250 in the bolt fitting 240, the wings 236 of the nut 234 fit into the notches 228 and retaining notches 230 in the plate 220, the bolt 232 is threaded into the nut 234, and the bolt fitting 240 fits between the nut 234 and the truss tube 216.

What is claimed is:

1. An open framework merchandise display system comprising:
    (a) a plurality of trusses, each of which comprises:
        (i) three parallel tubes; and
        (ii) a plurality of cross members which are arranged in trios along the tubes, each member of the trio joining a pair of tubes, each truss having a cross section which is the same as that of any other truss and has the shape of the isosceles triangle formed by joining two adjacent corners of a square with the midpoint of the side of the square opposite those corners;
    (b) a plurality of junction plates, each of which comprises:
        (i) a plate;
        (ii) three rods which protrude perpendicularly from one face of the plate and are so sized and situated as to penetrate the tubes of a truss; and
        (iii) a post which is in the shape of a rectangular parallelepiped, protrudes perpendicularly from the face of the plate opposite the rods, has an axis which intersect the center of the square from which the cross section of the truss was formed, has sides which are parallel to the sides of the square, has a hole through it, the axis of which is parallel both to the plate and to a pair of the sides of the post, and intersects the axis of the post; and has a slot through it, whose center plane is determined by the axis of the hole and the axis of the post, and which extends toward, but not to, the hole from the end of the post opposite the plate;
    (c) a plurality of junction flanges, each of which comprises:
        (i) a first horizontal plate which contains sixteen holes which each have a diameter approximately equal to that of a junction plate post hole, and are arranged in two concentric regular octagons which have parallel sides and have radii which differ by a distance approximately equal to the distance between the slot the hole of a junction plate post; and
        (ii) a second horizontal plate which has sixteen holes opposite the holes in the first horizontal plate, of equal diameter, and is above the first horizontal plate by a distance which is approximately equal to the distance between opposite sides of a junction plate post;
        (iii) eight rods which each have a diameter approximately equal to the thickness of a junction plate post slot, are perpendicular to, and join, the inner octagon of holes in the horizontal plates;
        (iv) a first vertical plate which is joined to the bottom of the first horizontal plate, offset from the center of the octagons, and includes a pair of holes which have diameters equal to those of a junction plate post hole are on a vertical line which intersects the point on the first vertical plate which is closest to the center of the octagons, and are separated by a distance approximately equal to the distance between the slot and the hole of a junction plate post;
        (v) a second vertical plate which is also joined to the bottom of the first horizontal plate, offset from the center of the octagons by an equal distance, but opposite direction, as the first vertical plate, is parallel to the first vertical plate, is separated from the first vertical plate by a distance approximately equal to the distance between opposite sides of a junction plate post, and includes a pair of holes opposite to, and of the same diameter as, the holes in the first vertical plate;
    (d) a multiplicity of means for fastening the junction plates to the junction flange, the diameters of which are approximately equal to those of the junction plate post holes;
    (e) one or more means for displaying merchandise; and
    (f) one or more means for attaching each display means to a truss, each attaching means comprising either a single attaching member or a spaced pair of parallel attaching members, the spacing being fixed and equal to the length of the side of the square from which the cross section of the truss was formed;
    whereby each vertical truss supports a junction plate oriented vertically, which in turn supports the bottom of a junction flange, the sides of which in turn support one or more junction plates oriented horizontally, each of which in turn supports a horizontal truss;
    whereby, at any increment of 45 degrees, a horizontal truss may be joined to a junction flange and an attaching means, parallel to and generally below the horizontal truss, with a single attaching member, may be used to attach the display means to the vertical truss; and
    whereby, at any increment of 90 degrees, the vertical truss further provides a pair of truss tubes to which an attaching means, parallel to and generally below the horizontal truss, with a spaced parallel pair of attaching members, may be used to attach the display means to the vertical truss without changing their spacing or parallelism.

2. The open framework merchandise display system of claim 1 wherein each junction plate post has a second hole and slot combination through it, having the same structure as the first hole and slot combination, but perpendicular to it;

whereby a junction plate may be detached from a junction flange, rotated axially through any increment of 90 degrees, and reattached to the junction flange.

3. The open framework merchandise display system of claim 2 wherein the junction flange further comprises a third vertical plate and a fourth vertical plate, which are coplanar with, and have the same structure as, the first and second vertical plates, which are joined to the top of the second horizontal plate, and which have the same orientation to the second horizontal plate as the first and second vertical plates have to the first horizontal plate;

whereby the junction flange may not only be supported by, but may also support, a vertical truss.

4. The open framework merchandise display system of claim 3 wherein each cross member of the truss is in the shape and orientation of a "Z" when the tubes of a truss are oriented vertically, and comprises a horizontal top member, a diagonal center member, and a horizontal bottom member, each of which joins two tubes of the truss; and consecutive cross members joining the same two tubes of the truss are so spaced from one another that, when a standard gridwall mount bracket is hung on the horizontal bottom member of the higher cross member, the bottom of the gridwall mount bracket is supported by the horizontal top member of the lower cross member.

5. The open framework merchandise display system of claim 4 further comprising one or more truss centerplates, each of which comprises a junction plate with the post omitted and the rods protruding from both faces of the plate;

whereby a short truss may be fastened to each face of the truss centerplate, thereby effectively producing a longer truss.

6. The open framework merchandise display system of claim 5 wherein each truss has a length which is some unit length, or an integral multiple of that unit length;

whereby a combination truss, formed by joining two shorter trusses with a centerplate, has the same length as a longer, non-combination truss.

7. The open framework merchandise display system of claim 6, wherein the junction flange is so sized that, when junction plates are joined to opposite sides of the junction flange, whether horizontally or vertically, their outer faces are separated by a distance equal to the unit length;

whereby a junction flange and a minimun length truss may be substituted for each other.

8. The open framework merchandise display system of claim 7, further comprising a plurality of base plates, each of which comprises a junction plate with the post omitted, joined to those vertical trusses which rest upon a supporting surface.

9. The open framework merchandise display system of claim 8, wherein each junction plate, truss centerplate, and base plate has a hole through it near the short side of the junction plate, truss centerplate, or base plate, for access into the interior of the truss.

10. The open framework merchandise display system of claim 9, further comprising one or more spacers, each of which comprises the post of a junction plate which is joined, at the end opposite the slotted end, to a plate, which is perpendicular to the axis of the post, and which has with holes in it;

whereby fasteners may be inserted through the holes and into a wall or ceiling, thereby spacing an attached junction flange at the desired distance from the wall or ceiling.

11. The open framework merchandise display system of claim 10 wherein each attaching means comprises means for joining the attaching means to the display means and a compression grip which comprises;

(a) an approximately rectangular plate, the center of which is permanently attached to the display means, or some fitting to the display means, the long axis of which is bent into a "U", and one long side of which has a pair of symmetrical notches, one near each end;

(b) a bolt;

(c) a threaded nut with a pair of wings protruding from its sides, each wing being opposite the other, the distance from the distal end of one wing to the distal end of the other being greater than distance between the notches across the "U", and the diameter of each wing being slightly less than the width of the notches; and (d) an unthreaded hollow bolt fitting, the interior diameter of which is slightly larger than the diameter of the bolt, the exterior surface of which has a shape inverse to the shape of the truss tube, and which includes two enclosed slots on opposite sides of the bolt, parallel to the bolt and to each other, sized to receive the plate;

Whereby the plate fits around the truss tube and through the slots in the bolt fitting, the wings of the nut fit into the notches in the plate, the bolt fits into the nut, and the bolt fitting fits between the nut and the truss tube.

* * * * *